Aug. 14, 1934.  F. G. LILJENROTH  1,969,894
METHOD OF PRODUCING SOLUBLE PHOSPHATES IN SOLID STATE
Filed March 31, 1931
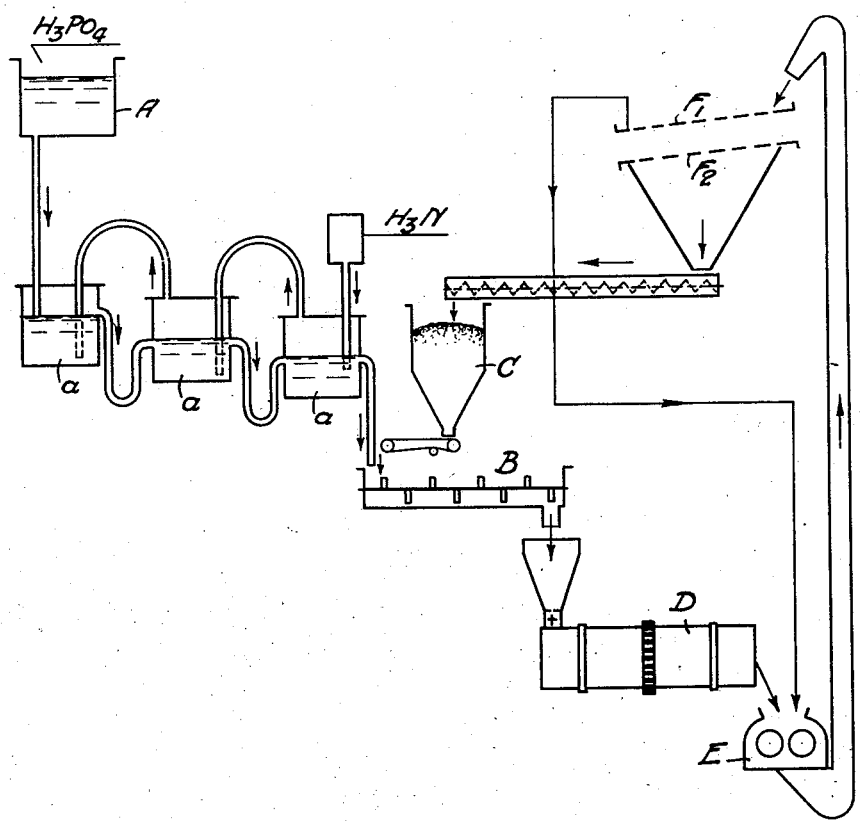
FRANS GEORG LILJENROTH
INVENTOR
ATTORNEY Patented Aug. 14, 1934

1,969,894

UNITED STATES PATENT OFFICE

1,969,894

METHOD OF PRODUCING SOLUBLE PHOSPHATES IN SOLID STATE

Frans Georg Liljenroth, Stockholm, Sweden

Application March 31, 1931, Serial No. 526,639
In Sweden April 3, 1930

1 Claim. (Cl. 23—107)

In the leaching of phosphate rock with sulphuric acid with or without an addition of alkali sulphate or with another mineral acid with an addition of alkali sulphate a phosphoric acid solution is obtained which generally contains as impurities soluble salts of iron, aluminium and calcium. When the solution produced is neutralized with ammonia for the recovery of salts from the solution citrate—soluble phosphates of said metals are precipitated in mixture with the ammonium phosphate crystallizing out from the solution. The drying of the moist reaction magma thus obtained presents great difficulties, especially when the phosphoric acid has been neutralized to diammonium phosphate, due to the sticky character of the magma.

The manufacture of diammonium phosphate by direct neutralization of the phosphoric acid solution requires also that the solution is rather dilute as the salt mixture otherwise solidifies if the temperature is kept low, while the diammonium phosphate is decomposed into ammonia and mono-ammonium phosphate if the temperature is kept high. The diammonium phosphate must, therefore, be produced with a rather high content of water which renders the drying operation still more difficult.

The object of this invention is to remove said difficulties in the drying operation and to render it possible to produce a dry granular product. The invention consists, chiefly, in this that a part of the finished dried product is returned to the process and mixed with the moist reaction mass or magma to be dried, thus improving the physical properties of the latter product in such degree that it can be treated without difficulty in an ordinary drying apparatus.

In the accompanying drawing I have shown diagrammatically one embodiment of an apparatus adapted for the performance of my improved process.

A strong phosphoric acid solution produced by leaching of phosphate rock according to any well-known method is supplied from a vessel A to a series of neutralization vessels $a$ having, preferably, agitators for the stirring of the solution while ammonia is supplied in counter-current through the vessels $a$ to neutralize the solution. The more or less fluid reaction mass or magma thus obtained is supplied from the last vessel $a$ to a mixer B in which also dried salt from a container C is introduced. The quantity of dried salt is so related to the magma that the mixture obtains substantially the character of a solid product with such physical properties that it can be dried in any drier without adhering to the walls or movable parts of said apparatus. From the mixer B the moist salt mixture is supplied to a drier, for instance an ordinary hot air drier D. The dried material which is delivered from the drum D is crushed in a disintegrator E and is then screened between two screens $F_1$ $F_2$ for the purpose of obtaining the desired grain size of the finished product. The upper screen may for instance be a 8 mesh and the lower one a 20 mesh Tyler standard screen. The material which does not pass through the upper screen is returned to the disintegrator. The material which passes through the upper screen but is retained by the lower screen constitutes the marketable product. The material which passes through the lower screen is collected in the container C and is then returned to the mixer B. If said latter material is not sufficient to give to the magma supplied from the last neutralization vessel $a$ the desired properties, also a part of the finished dried product may be used for such purpose.

*Example.*—327 liters of a phosphoric acid solution having a specific gravity of 1.415 and containing 36% $P_2O_5$ was preheated to 107° C. whereupon ammonia gas was supplied to the acid solution. The temperature raised at first to 110° C. but dropped at the end of the saturation period to 78° C. The total quantity of ammonia gas supplied amounted to 12 kgs. The reaction mass obtained was mixed with dried material in the proportion of 2 parts of moist magma to 3 parts of dried material. The mixture was then dried in an ordinary hot air drier. The escaping gases had a temperature of 90° C. and smelled slightly from ammonia. The analysis of the dried product gave as a result 47% water-soluble $P_2O_5$, 2% citrate-soluble $P_2O_5$ and .55 $P_2O_5$ soluble in citric acid. The content of nitrogen amounted to 17.95% $N_2$ as ammonia.

What I claim is:

The process of manufacturing soluble phosphate in a solid state from phosphate rock by dissolving the phosphate rock in an acid solution which comprises precipitating the lime as calcium sulfate, neutralizing the clear solution with ammonia, mixing the moist reaction mass obtained in the neutralization with finished dried phosphate, drying the mixture, crushing and screening the dried product, and adding the fine screened material to the moist reaction mass in the prosecution of the process.

FRANS GEORG LILJENROTH.